United States Patent

Takato

[11] Patent Number: 6,005,933
[45] Date of Patent: Dec. 21, 1999

[54] METHOD FOR COMMUNICATION WITH NO POWER FEED AND EXCHANGE FOR REALIZING THE METHOD

[75] Inventor: Kenji Takato, Kawasaki, Japan

[73] Assignee: Fujitsu Limited, Kanagawa, Japan

[21] Appl. No.: 08/997,436

[22] Filed: Dec. 23, 1997

[30] Foreign Application Priority Data

Dec. 25, 1996 [JP] Japan .................................. 8-345039
Nov. 19, 1997 [JP] Japan .................................. 9-317925

[51] Int. Cl.⁶ .............................. H04M 3/42; H04M 3/00; H04M 1/00
[52] U.S. Cl. ........................ 379/322; 379/201; 379/323; 379/377; 379/399
[58] Field of Search ................................. 379/201, 322, 379/323, 324, 377, 399, 333, 334, 382, 413

[56] References Cited

U.S. PATENT DOCUMENTS 5,323,453 6/1994 Arras et al. .............................. 379/322
5,416,832 5/1995 Nitta et al. .............................. 379/190

*Primary Examiner*—Krista Zele
*Assistant Examiner*—David Huynh
*Attorney, Agent, or Firm*—Helfgott & Karas, P C.

[57] ABSTRACT

Disclosed is a method for communication with no power feed in an exchange. (1) A calling subscriber unit transmits a special service code designating the disuse of a direct current loop together with the numeric information on the called subscriber unit to the exchange after formation of a direct current loop. (2) When the special service code is received, an on-hook transmission state in which the transmission and reception of an alternating current signal is possible between the subscriber line interface circuit and the calling subscriber unit even if no direct current loop is formed is established in the subscriber line interface circuit to which the calling subscriber unit which has transmitted the special service code is connected. (3) The calling subscriber unit disconnects the direct current loop, and the exchange maintains the speech path between the calling subscriber unit and the called subscriber unit even after the direct current loop is disconnected. (4) An alternating current signal is transmitted and received between the subscriber line interface circuit and the calling subscriber unit in the state in which no direct current loop is formed.

7 Claims, 16 Drawing Sheets

FIG. 5A
0V
FIG. 5B
−48V
FIG. 5C
0V
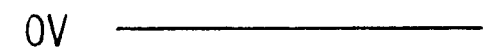
−3V 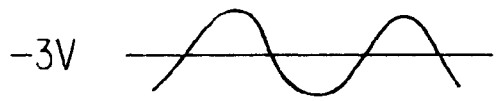
FIG. 5D
−45V 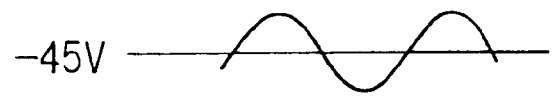
−48V 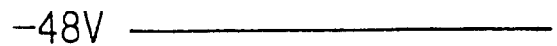

METHOD FOR COMMUNICATION WITH NO POWER FEED AND EXCHANGE FOR REALIZING THE METHOD

BACKGROUND OF THE INVENTION

The present invention relates to a method for communication with no power feed and an exchange for realizing the method and, more particularly, to a method for enabling communication with no power feed, that is, without feeding a direct current (speech current) to a calling subscriber unit and an exchange for realizing this method.

In a conventional protocol for connecting a subscriber telephone and an exchange, a direct current loop is first formed by the switch circuit (hook switch) of the telephone via the telephone and the subscriber line interface circuit (SLIC) of the exchange, and a destination telephone number is then input through the telephone. The exchange identifies the calling subscriber telephone by detecting the direct current loop formed in the subscriber line interface circuit, and forms a speech path between the calling subscriber telephone and the called subscriber telephone so as to enable communication. When the exchange detects the disconnection of the direct current loop in the subscriber line interface circuit, the exchange regards it as the end of communication and disconnects the speech path between the calling subscriber telephone, which is connected to the subscriber line interface circuit, and the called subscriber telephone. A direct current loop is formed and a call is begun when the handset of the telephone is lifted (off-hook) and it is disconnected and the communication is finished when the handset is restored (on-hook). In addition, when the bell of the called subscriber telephone rings, a direct loop is also formed by the off-hook operation.

FIG. 13 shows the structure of a conventional exchange and FIG. 14 shows the entire structure of connection including a subscriber line interface circuit and telephones. In FIGS. 13 and 14, the reference numerals $1a_1$ to $1a_n$ represent telephones, 2 an exchange, $2a_1$ to $2a_n$ an subscriber line interface circuits connected to the respective telephones $1a_1$ to $1a_n$, $2b$ a PCM switch circuit constituted by a space switch, a time switch and the like, $2c$ a processor for controlling a calling process such as the connection/disconnection of the path by controlling the PCM switch circuit, $2d$ a main memory for storing various data, $2f$ a centralized supervisory equipment for discriminating the off-hook/on-hook of a telephone (connection/disconnection of a direct loop), identifying a dial number and transferring the information to the processor $2c$, and $2g_1$ to $2g_m$ trunk circuits.

In the telephone $1a_1$ in FIG. 14, the reference numeral $1_1$ denotes a hook switch, which is turned on when the handset of the telephone $1a_1$ is lifted so as to form a direct current loop (indicated by the broken line) for connecting the telephone $1a_1$ and the subscriber line interface circuit $2a_1$, and which is turned off when the hand set is restored to the original position so as to disconnect the direct current loop. The reference numeral $1_2$ represents a dial circuit for generating a dial pulse DP by disconnecting the direct current loop the number of times which corresponds to the dialed number, $1_3$ a speech circuit provided with a function of distributing the telephone cable to the signal lines of the transmitter and the receiver (not shown).

In the subscriber line interface circuit $2a_1$, the reference numeral $2_1$ represents a BSH circuit, and $2_2$ a CODEC (coder/decoder) for converting an analog speech signal (alternating current signal) into a PCM digital signal (A/D conversion) and converting a digital signal from a PCM highway 5 into an analog speech signal (D/A conversion). The BSH circuit $2_1$ is provided with a battery feed function for supplying a speech current to the telephone so as to operate the transmitter (microphone), etc., a supervisory function for supervising the state of the telephone so as to detect calling, answering, on-hook, dial pulse, etc., and a hybrid function. In the BSH circuit $2_1$, the reference numeral $2_{11}$ denotes a battery feed circuit (B) for supplying speech current, $2_{12}$ a supervision circuit (S) and $2_{13}$ a hybrid circuit (H). The transmission system on the telephone cable is a two-wire full duplex system for transmitting an electrical signal simultaneously in two ways through two wires.

When a direct current loop is formed via the hook switch $1_1$ of the telephone $1a_1$ and the battery feed circuit $2_{11}$ of the BSH circuit $2_1$, an alternating current signal as a speech signal of the telephone $1a_1$ is transmitted on the telephone cable superimposed with the direct loop current. In the subscriber line interface circuit $2a_1$, the alternating current signal passes through the hybrid circuit $2_{13}$ and it is converted into a digital signal by the CODEC $2_2$ and supplied to the PCM highway 5 in the form of a PCM signal. Thereafter, the PCM signal is processed by an exchange, it is input to the called subscriber telephone. The speech signal of the called subscriber telephone is input to the CODEC $2_2$ via the PCM switch circuit $2b$ (FIG. 13) and the PCM highway 5. The CODEC $2_2$ converts the digital signal into an analog signal and inputs the analog signal to the calling subscriber telephone superimposed with the direct loop current.

FIG. 15 is a flow chart of a conventional communication processing. When the handset of the telephone $1a_1$ is lifted so as to call, the off-hook switch $1_1$ is closed and a direct current loop is formed via the telephone $1a_1$ and the subscriber line interface circuit $2a_1$ (step 101). A destination telephone number (numeric information) is then transmitted in the form of a dial pulse signal (dial pulse system) or a PB signal (push-phone signal system) (step 102). In FIG. 15, the dial pulse system is shown.

The centralized supervisory equipment $2f$ of the exchange 2 is supervising the calling by scanning so as to find in which telephone the direct current loop is formed by operating the hook switch (step 201). When the telephone in which the direct loop current is formed is detected, the centralized supervisory equipment $2f$ reports the fact (SCN ON) to the processor $2c$ (step 202). When the processor $2c$ receives the report, it analyzes the information on the calling subscriber (e.g., whether or not the calling subscriber has paid the telephone bill) with reference to the calling subscriber data. If the processor $2c$ judges that communication is permissible, it connects a dial tone transmission circuit (not shown) to the calling subscriber telephone via the PCM switch circuit $2b$ so that the calling subscriber may hear the dial tone.

Thereafter, the centralized supervisory equipment $2f$ is in a numeric information receiving state (step 203). In this state, if the centralized supervisory equipment $2f$ receives the destination telephone number, it sequentially transmits the numerals to the processor $2c$ (step 204). The processor $2c$ disconnects the connection of the dial tone transmission circuit when it receives the first numeric information. When the processor $2c$ has received all the numerals of the telephone number, the processor $2c$ analyzes the information on the called subscriber (e.g., whether or not the called subscriber has paid the telephone bill, whether or not the telephone is occupied, and whether or not the telephone number is now in use). If the connection of the speech path is possible, the processor 2c starts to call the called subscriber and connects a ring back tone transmission circuit to the calling subscriber telephone so that the calling subscriber may hear the ring back tone (step 205).

If the processor 2c detects the off-hook of the called subscriber telephone (formation of a direct current loop), it stops calling the called subscriber telephone, disconnects the connection of the ring back tone transmission circuit, and forms a speech path between the calling subscriber telephone and the called subscriber telephone. Thereafter, the calling subscriber telephone and the called subscriber telephone are in a communication state (step 206). The exchange 2 continues the connection of the PCM highway 5 with the called subscriber telephones as long as the direct current loop is formed.

When the communication is finished and the handset is restored to the original position, the hook switch $1_1$ is turned off, and the direct current loop is disconnected (step 103). The telephone assumes the on-hook condition (step 104). The centralized supervisory equipment 2f assumes an on-hook supervisory state and supervises by scanning in which telephone the direct current loop has been disconnected. When the centralized supervisory equipment 2f detects the disconnection of the direct current loop of the telephone $1a_1$, it reports the fact (SCN OFF) to the processor 2c (step 207). When the processor 2c receives the report, it executes an on-hook processing such as the disconnection of the speech path between the telephones (step 208).

As described above, the direct current loop has not only (1) a function of providing a state signal indicating the off-hook/on-hook state of a telephone to the exchange (signalling function), but also (2) a function of supplying a speech current for operating the transmitter (microphone) of the telephone (battery function) and (3) a function of transmitting an alternating current signal (speech signal) superimposed with a direct current (alternating current transmitting function).

FIG. 16 shows the structure of the connection including a personal computer provided with a modulator-demodulator (MODEM) and a subscriber line interface circuit. The same reference numerals are provide for the elements which are the same as those shown in FIG. 14. The reference numeral 3a represents a personal computer, 4a a connecting apparatus containing a MODEM for connecting the personal computer 3a with the subscriber line interface circuit 2a, $4a_1$ a MODEM (modulator-demodulator) and $4a_2$ a switch for connecting/disconnecting a direct current loop. The symbol R denotes a direct current load resistance, and C a capacitor for disconnecting a direct current. The MODEM $4a_1$ transmits an alternating current signal (analog signal) in a voice band (300 to 3400 Hz) to a telephone cable after it is subjected to a predetermined modulation such as amplitude modulation, phase modulation, frequency modulation and QAM modulation with an I/O digital signal input from the personal computer 3a, and the MODEM $4a_1$ also demodulates an analog signal input from the telephone cable into a digital signal and inputs it to the personal computer 3a.

In order to start personal computer communication (electronic mail communication in an internet, etc.), a switch $4a_2$ is turned on under the control of the personal computer 3a so as to form a direct current loop in the same way as in a telephone, and then the switch is turned on and off in accordance with the destination telephone number so as to generate a dial pulse. The exchange connects the calling personal computer 3a with the called personal computer, and continues the connection of the PCM highway 5 with the called personal computers as long as the direct current loop is formed. Thereafter, the MODEM $4a_1$ modulates the analog signal with the digital signal input from the personal computer 3a and transmits it to the called personal computer. In order to end the personal computer communication, the switch $4a_2$ is turned off so as to disconnect the direct current loop in the same way as in a telephone.

Since the MODEM and the personal computer uses commercial power source (e.g., AC 100 V) as the power source, they need not use a direct current loop as a power source unlike the transmitter of a telephone. In addition, once the MODEM is connected to a line, it is possible to continue the alternating connection between the MODEM and the line even if the direct current loop is disconnected. For this reason, although the disconnection of a direct current loop during communication may be thinkable, since communication is started and finished in the similar protocol as in a telephone, and since an alternating current signal is transmitted and received through a subscriber line interface circuit, a direct current loop is continuously formed during personal computer communication.

Therefore, in the communication using a personal computer and a modem, the direct current loop has (1) a function of providing a state signal indicating the start/middle/end of communication to the exchange (signalling function), and (2) a function of transmitting and receiving an alternating current signal in the subscriber line interface circuit (alternating current transmitting function).

Although a dial pulse system is explained in the above, the same can be said with a push-phone signal system using a PB signal. In the case of a push-phone signal system, however, a PB receiver circuit (PB-REC) is necessary in the exchange.

As described above, when communication is made with a destination unit through a conventional exchange, a direct current loop is constantly formed during communication. The direct current loop is used for the detection of a state signal of a subscriber apparatus (telephone, personal computer, MODEM), as described above, and it is also used for the battery feeding in a telephone. A comparatively large current such as 20 to 100 mA is necessary as a speech current, and the subscriber line interface circuit of the exchange supplies the speech current by using −48 V. In the case of a MODEM and a personal computer, since they use a commercial power source, it is not necessary to use a direct current loop as a power source, but it is necessary to continuously form a direct current loop, as described above, so that about a current of 20 to 100 mA constantly flows through the direct current loop during communication.

Therefore, the power consumed by the exchange as a whole is very large. For example, if it is assumed that a current of 40 mA flows at 48 V per circuit, the electric power consumed is 1.92 W. In the exchange accommodating 10,000 circuits, the electric power consumed reaches 19,200 W (400 A). The conventional activity ratio of a subscriber telephone is about 0.15 erl (erlangs) on the average, so that the electric power consumed is reduced to 19,200 W×0.15= 2880 W with the traffic taken into consideration. An exchange is generally designed on the basis of a traffic theory, and the power source and the heat of an exchange are designed on the basis of 0.15 erl. That is, they are designed on the assumption that the activity ratio of 1 erl never occurs, that is, on the assumption that all the subscribers never use the telephones simultaneously.

However, due to the spread of internets and electronic mails, the state in which subscribers uses their apparatuses for many hours has occurred. In personal computer communication or the like, computers are used for a much longer time in an off-hook state than telephones on which persons talk, and the activity ratio has a tendency to coming close to 1 erl. If it actually comes close to 1 erl, the electric power consumed by the exchange increases so much that it becomes a large problem with the exchange which is designed on the basis of the above-described traffic theory.

SUMMARY OF THE INVENTION

Accordingly, it is an object of the present invention to eliminate the above-described problems in the related art and to provide a communication method with no power feed which enables communication to continue even if a direct current loop is disconnected during communication, thereby reducing the power consumed by an exchange during communication, and an exchange for realizing this system.

To achieve this aim, in a first aspect of the present invention, there is provided a method for communication in an exchange including a step for forming a direct current loop through a subscriber line interface circuit of an exchange and a calling subscriber unit which is connected to the subscriber line interface circuit by closing a switch circuit in the calling subscriber unit, a step for designating number of a called subscriber unit from the calling subscriber unit and a step for forming a speech path between the called subscriber unit and the calling subscriber unit while the formation of said direct current loop is detected in said subscriber line interface circuit, comprising the steps of: (1) closing a switch circuit of a calling subscriber unit which is connected to a subscriber line interface circuit of an exchange so as to form a direct current loop through said subscriber line interface circuit and said calling subscriber unit; (2) transmitting a special service code for instructing the disuse of said direct current loop together with the number of a called subscriber unit from said calling subscriber unit to the exchange; (3) forming a speech path by said exchange between said calling subscriber unit and said called subscriber unit; (4) establishing an on-hook transmission state in said subscriber line interface circuit to which said calling subscriber unit which has transmitted said special service code is connected, by said exchange, in which transmission and reception of an alternating current signal is possible between said subscriber line interface circuit and said calling subscriber unit even if no direct current loop is formed; (5) opening said switch circuit of said calling subscriber unit so as to disconnect said direct current loop; (6) maintaining said speech path between said calling subscriber unit and said called subscriber unit by said exchange even after said direct current loop is disconnected; and (7) transmitting and receiving an alternating current signal between said subscriber line interface circuit and said calling subscriber unit in said on-hook transmission state.

In a method for communication with no power feed provided in a second aspect of the present invention, (1) a direct current loop is formed by closing the switch circuit and thereafter disconnect by opening the switch circuit by the calling subscriber unit while the speech path is maintained, and (2) the exchange executes an on-hook process by disconnecting the speech path when the disconnection of the direct current loop after the formation thereof is detected in the subscriber line interface circuit while the speech path is maintained.

In a third aspect of the present invention, there is provided an exchange including means for forming a direct current loop through a subscriber line interface circuit of an exchange and a calling subscriber unit which is connected to the subscriber line interface circuit by closing a switch circuit in the calling subscriber unit and means for forming a speech path between the calling subscriber unit and a called subscriber unit designated by the numbers supplied from the calling subscriber unit while the formation of said direct current loop is detected in said subscriber line interface circuit, comprising:

a subscriber line interface circuit connected to a calling subscriber unit which forms a direct current loop therebetween by closing a switch circuit wherein the subscriber line interface circuit is able to assume an on-hook transmission state in which transmission and reception of an alternating current signal is possible between said subscriber line interface circuit and said calling subscriber unit even if no direct current loop is formed;

a means for receiving numerals transmitted from said calling subscriber unit via said subscriber line interface circuit after the formation of the direct current loop and detecting a special service code which designates the disuse of said direct current loop from said numerals received;

a means for forming a speech path between said calling subscriber unit and a called subscriber unit the number of which is designated by said calling subscriber unit and detected from said numerals received;

a means for establishing an on-hook transmission state in said subscriber line interface circuit to which said calling subscriber unit which has transmitted said special service code is connected, when said special service code is detected; and a means for maintaining said speech path between said calling subscriber unit which has transmitted said special service code and said called subscriber unit even if said direct current loop is disconnected, when said special service code is received, wherein an alternating current signal is transmitted and received between said subscriber line interface circuit and said calling subscriber unit in said on-hook transmission state.

Other features and advantages of the present invention will be apparent from the following description taken in conjunction with the accompanying drawings.

BRIEF DESCRIPTION OF THE DRAWINGS

FIGS. 5A to 5D are explanatory views of the operation of a battery feed circuit;

Figure 1:
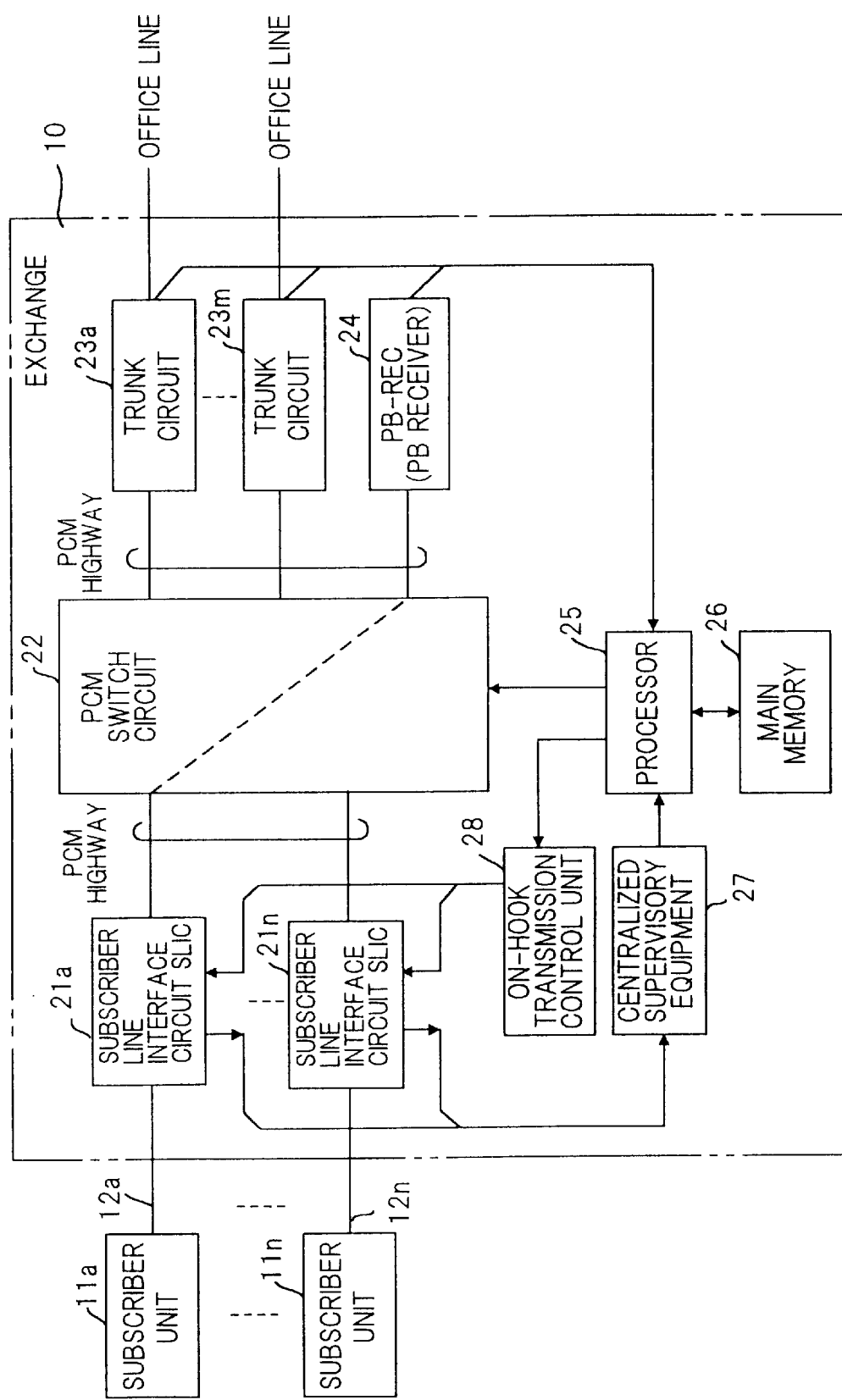
FIG. 1 shows the structure of an exchange (push-phone system) according to the present invention.

DESCRIPTION OF THE PREFERRED EMBODIMENTS (A) The Principle of the Invention

A terminal in an internet or the like is ordinarily a unit using a personal computer and contains a MODEM as a means corresponding to the microphone (speech signal transmitting means) of a telephone. The personal computer and the MODEM are operated by a commercial power source, so that it requires no power source supply from an exchange (subscriber line interface circuit SLIC) during communication unlike a telephone. Therefore, (1) if it is possible to transmit and receive an alternating current signal between a subscriber line interface circuit of an exchange and a MODEM via a telephone cable even if there is no direct current loop, and (2) if it is possible to change the communication protocol so that the disconnection of a direct current loop during communication is not regarded as the end of communication, it is possible to disconnect the direct current loop during communication, thereby greatly reducing the power consumed by the exchange. In order to realize this idea, in the present invention, a special service code is transmitted from a subscriber unit to the exchange at the time of calling. When the exchange receives the special service code, it does not regard a disconnection of a direct current loop as the end of communication and it establishes an on-hook transmission (OHT) state in the subscriber line interface circuit in which the transmission and reception of an alternating current signal is possible even if the direct loop current is zero. And when a direct current loop is formed again during communication, and the direct current loop is disconnected thereafter, the exchange regards the disconnection as the end of communication.

More specifically, after the calling subscriber forms a direct current loop at the time of calling, it transmits a special service code which designates the disuse of the direct current loop to the exchange together with the numeric information on the called subscriber unit (destination telephone number). When the exchange receives the destination telephone number, it connects the calling subscriber unit with the called subscriber unit, and if it receives the special service code, it establishes an on-hook transmission (OHT) state in the subscriber line interface circuit to which the calling subscriber unit is connected, in which state the transmission and reception of an alternating current signal to and from the subscriber unit is possible even if the direct loop current is zero. The calling subscriber unit then disconnects the direct current loop. Even if the direct current loop is disconnected, the exchange, which has received the special service code, does not disconnect the speech path between the calling subscriber unit and the called subscriber unit but maintains the communication state, and the subscriber line interface circuit transmits and receives an alternating current signal to and from the calling subscriber unit while there is no direct current loop. In this communication state, if the calling subscriber unit forms a direct current loop and disconnects it thereafter, the exchange disconnects the speech path and executes an on-hook processing.

In this manner, it is possible to disconnect a direct current loop during communication, so that even if the line is continuously connected for many hours in the internet communication or the like, the power consumed by the exchange is greatly reduced and, in addition, an exchange designed on the basis of the conventional traffic theory is usable as it is.

Furthermore, if a telephone is so constituted as to permit the battery feed from a commercial power source or an internal battery, the telephone requires no power supply from the exchange (subscriber line interface circuit) during communication, and it is possible to disconnect a direct current loop, as described above, thereby reducing the power consumed by the exchange.

(B) First Embodiment (a) Structure of an Exchange

Figure 2:
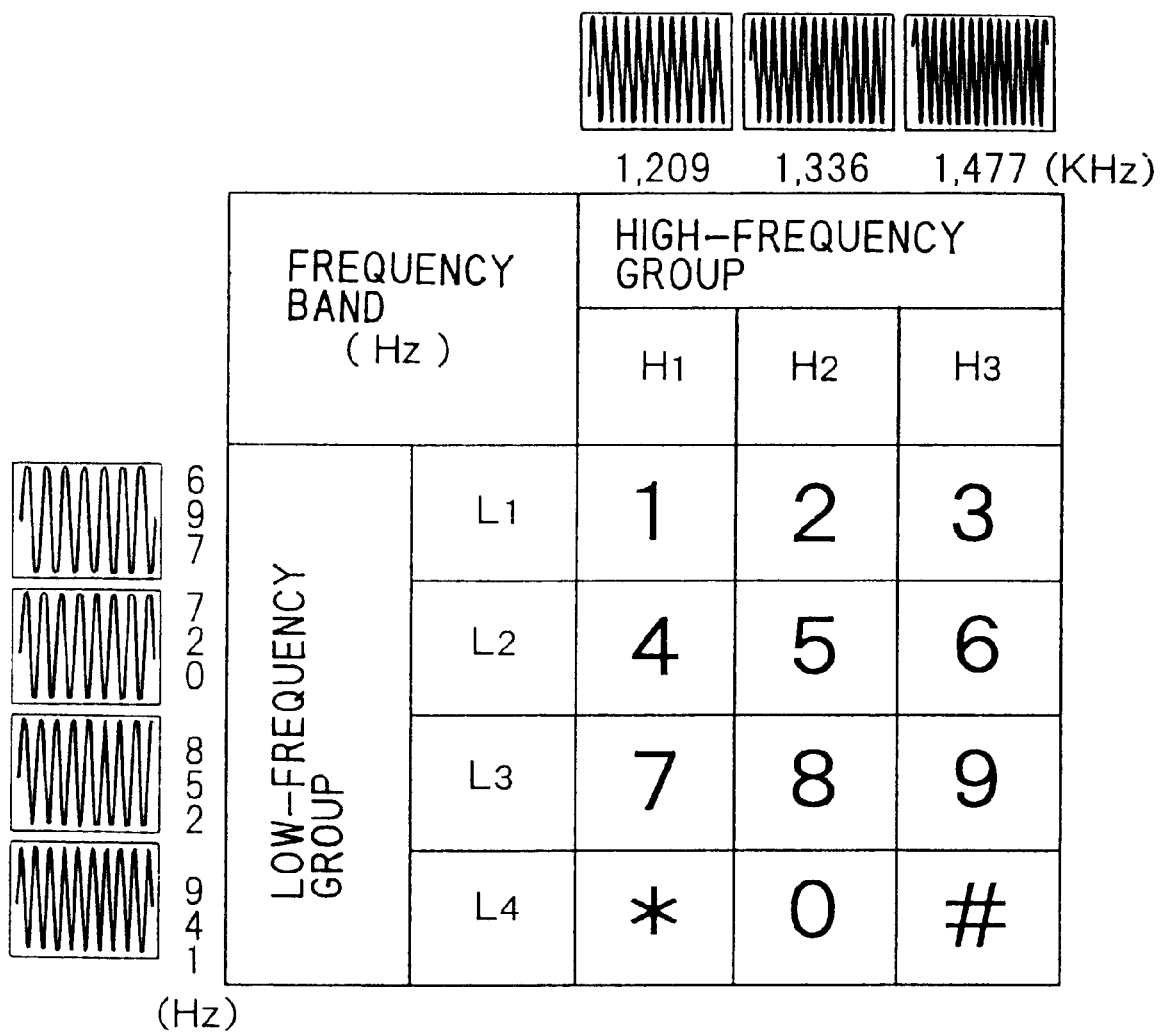
FIG. 2 is an explanatory view of a PB signal.

FIG. 1 shows the structure of an exchange according to the present invention. In FIG. 1, the reference numeral 10 represents a digital exchange, 11a to 11n subscriber units provided with MODEMs. and 12a to 12n telephone cables. In the exchange 10, the reference numerals 21a to 21n represent subscriber line interface circuits which are connected to the corresponding subscriber units, 22 a PCM switch circuit constituted by a space switch, a time switch and the like, 23a to 23m trunk circuits connected to the office lines, and 24 a PB receiver (PB-REC) for receiving a push-phone signal (PB signal) and identifying the numeric information. A PB signal is a signal formed by synthesizing a high-frequency signal $H_1$ to $H_3$ and a low-frequency signal $L_1$ to $L_3$ which correspond to the numerals (0 to 9) and symbols (* and #), as shown in FIG. 2. The PB receiver 24 identifies the number and the symbol from the PB signal and inputs them to a processor. The reference number 25 represents a processor for controlling the PCM switch circuit so as to control a calling process such as the connection/disconnection of the path, 26 a main memory for storing various data, 27 a centralized supervisory equipment for detecting the connection/disconnection of a direct current loop in each subscriber line interface circuit and reporting the result of detection to the processor 25, and 28 an OHT control unit for establishing an on-hook transmission (OHT) state in a subscriber line interface circuit in which the transmission and reception of an alternating current signal to and from the subscriber unit is possible even if the direct loop current is zero.

Figure 3:
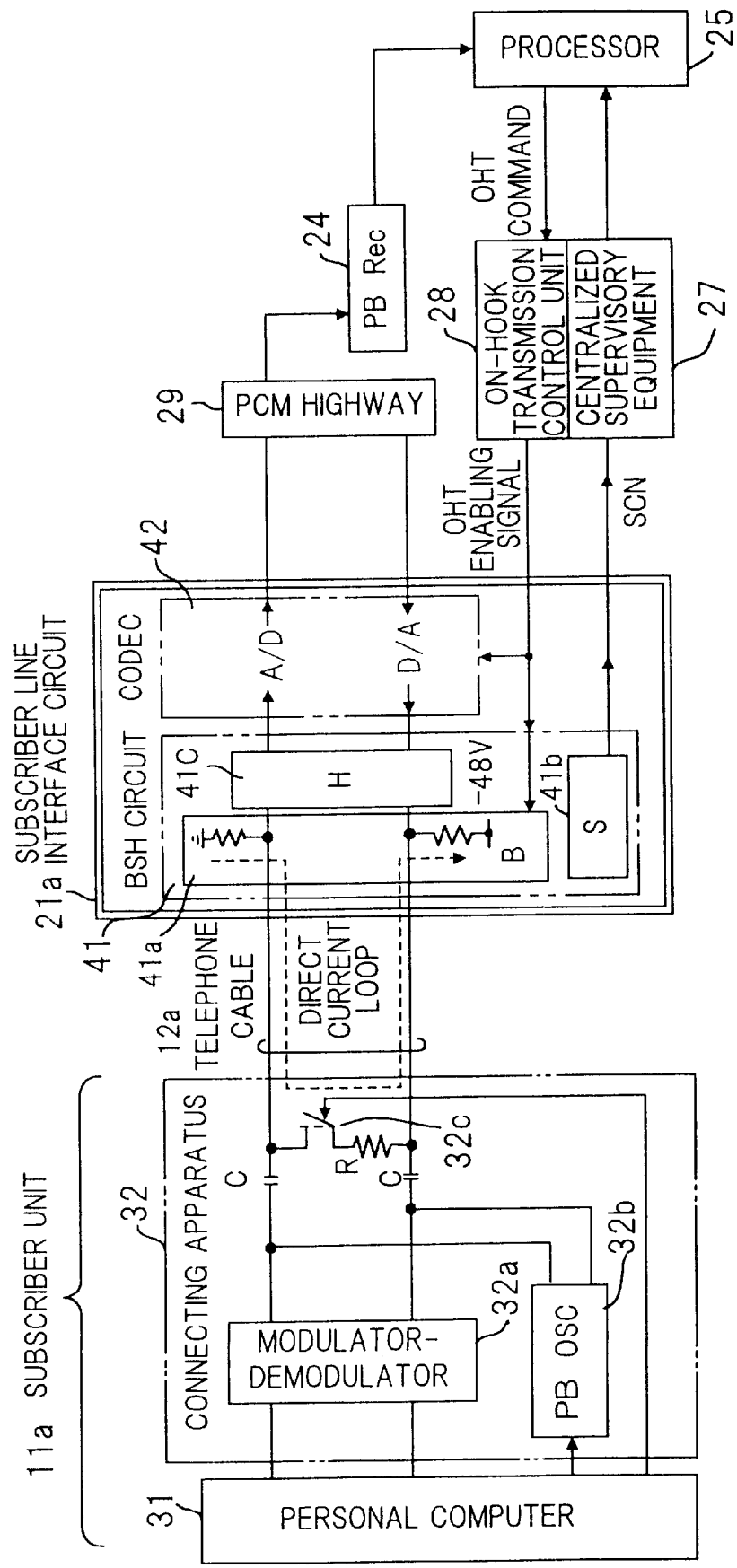
FIG. 3 shows the entire connection structure (push-phone system) including a subscriber unit and a subscriber line interface circuit.

(b) The Connection Structure Between a Subscriber Unit and a Subscriber Line Interface Circuit FIG. 3 shows the entire connection structure including a subscriber unit and a subscriber line interface circuit. In FIG. 3, the same reference numerals are provided for the elements which are the same as those shown in FIG. 1.

In the subscriber unit 11a, the reference numeral 31 represents a personal computer, and 32 a connecting apparatus for connecting the personal computer 31 with the telephone cable 12a. The reference numeral 32a represents a MODEM (modulator-demodulator), 32b a PB oscillator for outputting a PB signal which corresponds to a destination telephone number and a PB signal which corresponds to a special service code (#xxx) indicating the disuse of a direct current loop, and 32c a switch (switch circuit) which is turned on/off so as to connect/disconnect a direct current loop designated by the broken line. The symbol R denotes a direct current load resistance, and C a capacitor for disconnecting a direct current. The MODEM 32a transmits an alternating current signal (analog signal) in a voice band (300 to 3400 Hz) to the telephone cable 12a after a predetermined modulation, and also demodulates an analog signal input from the telephone cable 12a into a digital signal and inputs it to the personal computer 31.

In the subscriber line interface circuit 21a, the reference numeral 41 represents a BSH circuit, 42 a CODEC (coder/decoder) for converting a speech signal (alternating current signal) into a PCM digital signal and transmitting it to a PCM highway 29. The CODEC 42 also converts a digital signal from the PCM highway 29 into an analog signal. The BSH circuit 41 is provided with a battery feed function for feeding a speech current to the telephone so as to operate the transmitter (microphone), etc., a supervision function for supervising the state of the telephone so as to detect calling, answering, end of speech, etc., and a hybrid function. In the BSH circuit 41, the reference numeral 41a denotes a battery feed circuit (B), 41b a supervision circuit (S) for supervising the connection/disconnection of a direct current loop, and 41c a hybrid circuit (H).

(c) BSH Circuit

Figure 4:
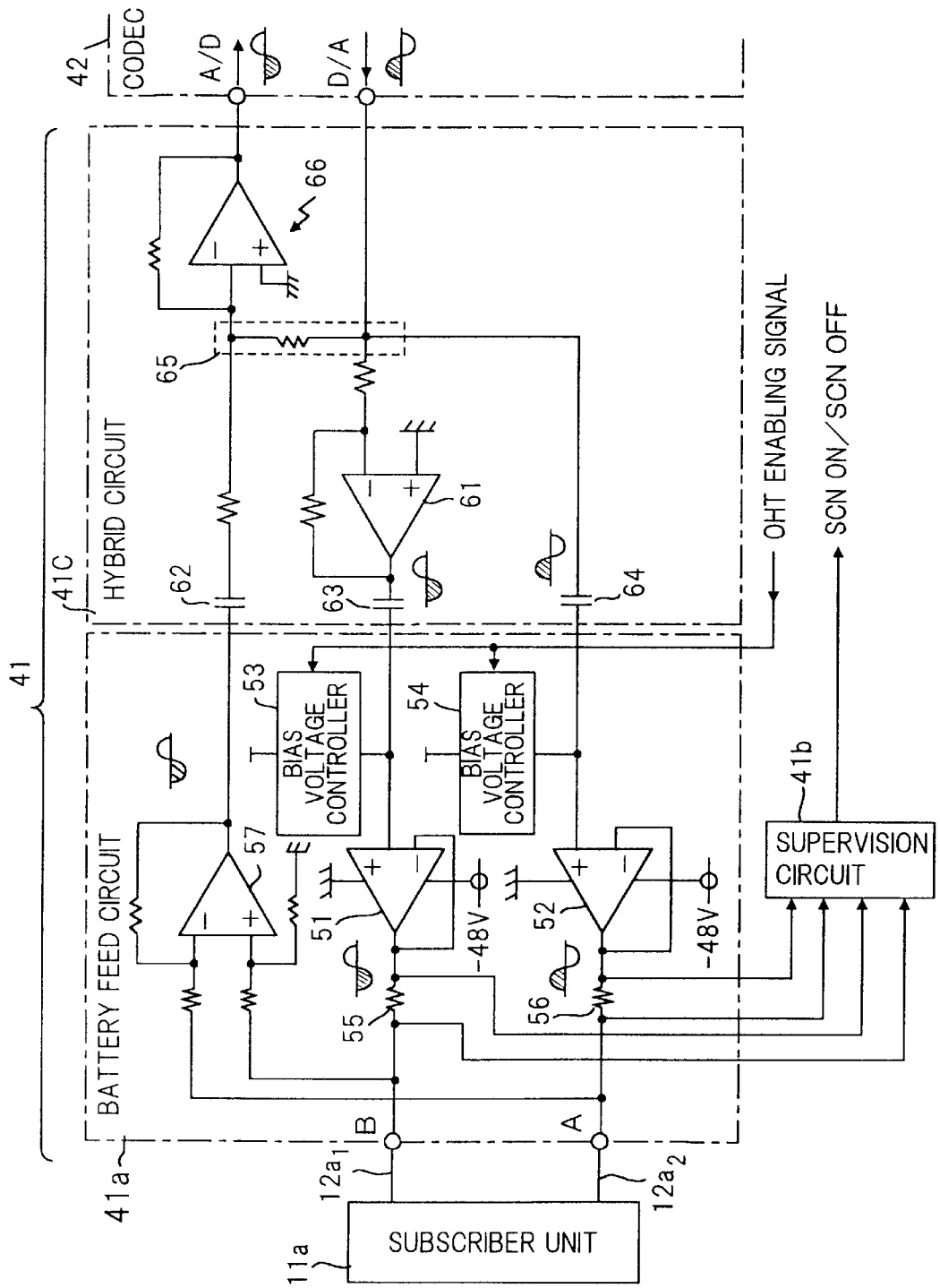
FIG. 4 shows the detailed structure of a BSH circuit.

FIG. 4 shows the detailed structure of the BSH circuit 41. In FIG. 4, the reference numeral 11a represents a subscriber unit, $12a_1$, $12a_2$ a pair of telephone cables, 41 the BSH circuit, and 42 the CODEC. In the BSH circuit 41, the reference numeral 41a denotes the battery feed circuit, 41b the supervision circuit for supervising the connection/disconnection of a direct current loop, and 41c the hybrid circuit.

(c-1) Battery Feed Circuit

In the battery feed circuit 41a, the reference numeral 51 and 52 denote voltage followers constituted by operational amplifiers, 53 and 54 bias voltage controllers for controlling the bias voltages of the input terminals of the respective voltage followers 51, 52, 55 and 56 resistors provided between the output terminals of the respective voltage followers 51, 52 and the respective telephone cables $12a_1$, $12a_2$, and 57 a differential amplifier for amplifying alternating current signals on the telephone cables $12a_1$, $12a_2$. In the voltage followers 51, 52, the output terminals are connected to the inverting input terminals (−) of the operational amplifiers and the non-inverting input terminals (+) are used as the signal input terminals. They are operational amplifier applied circuits which have a high input impedance and a low output impedance of 0Ω and have a gain of 1.

The bias voltage controller 53 inputs a bias voltage of 0 V to the input terminal of the voltage follower 51 in an ordinary state, while inputting a bias voltage of, for example, −3 V to the input terminal of the voltage follower 51 in an on-hook transmission (OHT) state. The bias voltage controller 54 inputs a bias voltage of −48 V to the input terminal of the voltage follower 52 in an ordinary state, while inputting a bias voltage of, for example, −45 V to the input terminal of the voltage follower 52 in an on-hook transmission (OHT) state.

In an ordinary state, the input terminals of the voltage followers 51, 52 are biased to 0 V and −48 V, respectively, and the output terminal B and the output terminal A are clamped to 0 V and −48 V. respectively. Therefore, even if an alternating current signal indicated by the solid line in FIG. 5B is input to the voltage follower 51, the positive signal portion is clamped to 0 V, as indicated by the broken line, so that it is impossible to output the alternating current signal accurately. Similarly, even if an alternating current signal indicated by the solid line in FIG. 5B is input to the voltage follower 52, the negative signal portion is clamped to −48 V, as indicated by the broken line, so that it is impossible to output the alternating current signal accurately.

On the other hand, in the on-hook transmission (OHT) state, the input terminals of the voltage followers 51, 52 are biased to −3 V and −45 V, respectively. In such a bias state, when an alternating current signal indicated by the solid line in FIG. 5C is input to the voltage follower 51, it is possible to output the alternating current signal accurately without any clamping.

Similarly, when an alternating current signal indicated by the solid line in FIG. 5D is input to the voltage follower 52, it is possible to output the alternating current signal accurately without any clamping. In some design of the battery feed portion, a method of constantly biasing the voltages to −3 V and −45 V is thinkable. In this method, however, the voltages at the time of on-hook is constantly lower than the supply voltage, which may be inconvenient to some terminals.

The differential amplifier 57 differentially amplifies the alternating current signals (analog signals) supplied from the subscriber unit 11a to the telephone cables $12a_1$, $12a_2$ and inputs the amplified signals to the CODEC 42 via the hybrid circuit 41c. Although the differential amplifier 57 also amplifies the analog signals output from the exchange side (voltage followers 51, 52), these analog signals are cancelled in the hybrid circuit 41c.

(c-2) Hybrid Circuit

In the hybrid circuit 41c, the reference numeral 61 represents an inverting amplifier for inverting the phase of the analog signal output from the CODEC 42 and amplifying the inverted signal, 62 to 64 capacitors for disconnecting a direct current, 65 a cancel circuit for cancelling the output signal from the exchange which loops via the differential amplifier 57, and 66 a non-inverting amplifier for amplifying the signal from the subscriber unit 11a and inputting the amplified signal to the CODEC 42.

The hybrid circuit 41 inputs the analog signal (alternating current signal) output from the CODEC 42 to the voltage follower 52 of the battery feed circuit 41a, and also inverts the phase of the analog signal and inputs it to the voltage follower 51. In addition, the hybrid circuit 41c amplifies the analog signal supplied from the subscriber unit 11a and inputs it to the CODEC 42.

(c-3) Supervision Circuit

The terminal voltages of the resistors 55 and 56 are input to the supervision circuit 41b, and the supervision circuit 41b outputs an SCN ON signal, which indicates the formation of a direct current loop, and an SCN OFF signal, which indicates the disconnection of a direct current loop on the basis of the terminal voltages.

(d) Communication Processing of the Invention

Figure 6:
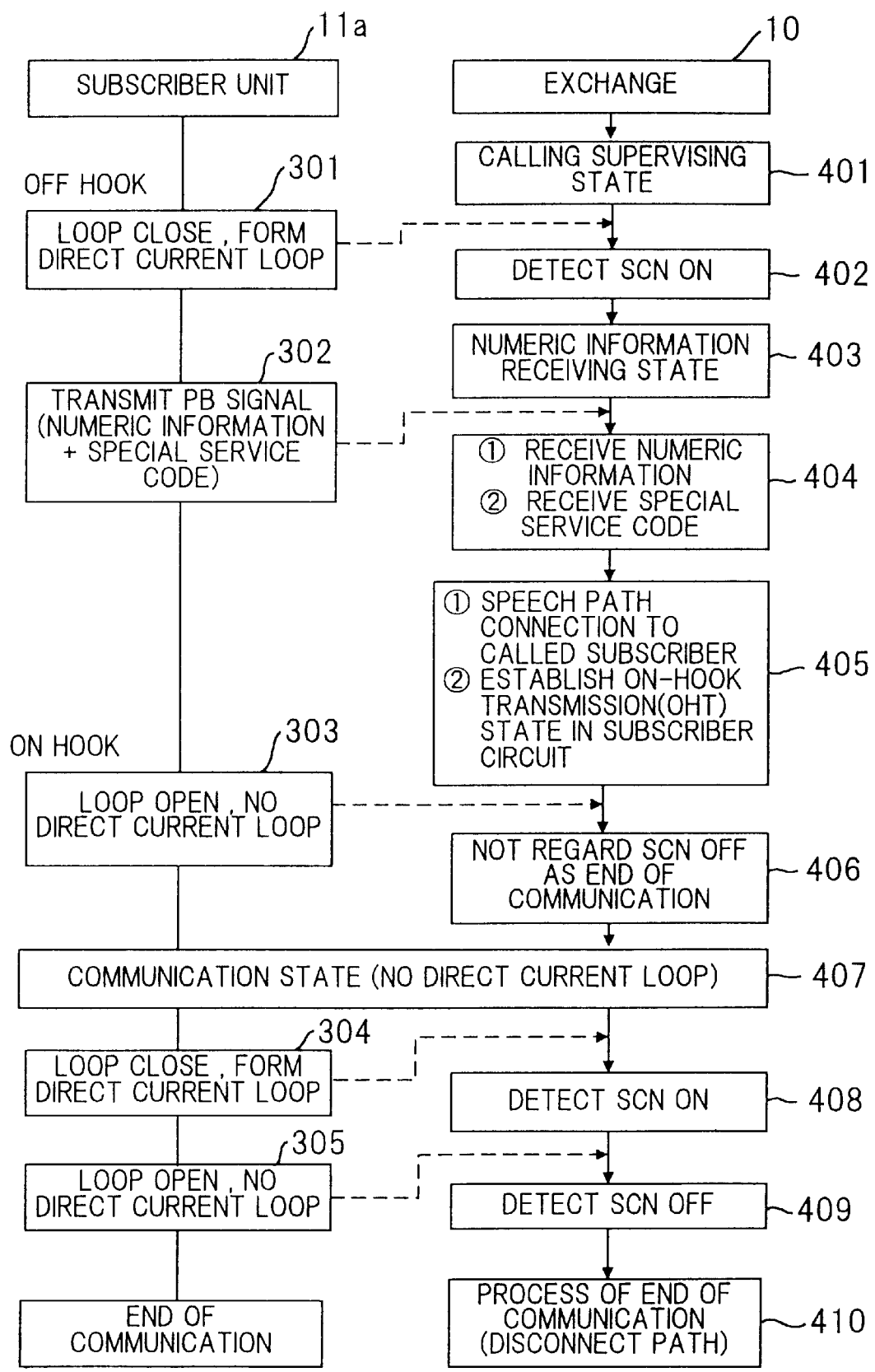
FIG. 6 is a flow chart of a communication processing according to the present invention.
Figure 7A:
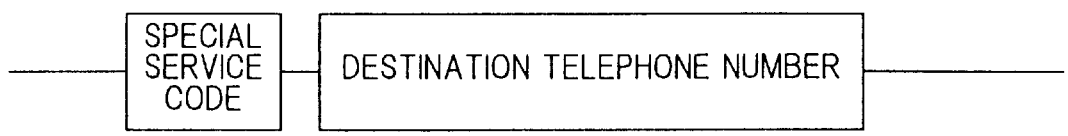
FIGS. 7A and 7B are explanatory views of the order of transmitting a special service code and a destination telephone number.
Figure 7B:

FIG. 6 is a flow chart of the processing by the subscriber unit 11a and the exchange 10, explaining the communication processing according to the present invention. At the time of calling, the switch 32c (FIG. 3) is first closed under the control of the personal computer 31 so as to form a closed loop via the subscriber line interface circuit 21a (step 301). The PB oscillator 32b is then so controlled by the personal computer 31 as to transmit the number of a destination telephone number (numeric information) and a special service code in the form of PB signals (step 302). The special service code is attached to the head of the destination telephone number, as shown in FIG. 7A, or to the tail of the destination telephone number, as shown in FIG. 7B, when it is transmitted.

The centralized supervisory equipment 27 of the exchange 10 is now supervising the calling, namely, the formation of a direct current loop in the subscriber line interface circuit 21*a* (step 401). When the centralized supervisory equipment 27 detects the formation of a direct current loop in the subscriber line interface circuit 21*a* from the closed contact of the switch 32*c*, it reports the fact (SCN ON) to the processor 25 (step 402). When the processor 25 receives the report, it controls the PCM switch circuit 22 so as to connect the PCM highway 29 of the subscriber line interface circuit 21*a* to the PB receiver 24 (FIG. 1) so that the PB receiver 24 assumes a numeric information receiving state (step 403). In this numeric information receiving state, the numeric information supplied from the subscriber unit 11*a* in the form of a PB signal is identified by the PB receiver 24 and input to the processor 25 (step 404).

If the processor 25 identifies the destination telephone number, it forms a speech path between the calling subscriber unit and the called subscriber unit. If the processor 25 identifies the special service code, it judges that the calling subscriber unit requests the disconnection of the direct current loop during communication and establishes an on-hook transmission (OHT) state in the subscriber line interface circuit 21*a* (step 405). More specifically, when the processor 25 receives the special service code, it inputs an OHT command to the OHT control unit 28. The OHT control unit 28 inputs an OHT enabling signal to the bias voltage controllers 53, 54 (see FIG. 4) of the battery feed circuit 41*a* in accordance with the OHT command. When the OHT enabling signal is input to the bias voltage controllers 53, 54, the bias voltage controllers 53, 54 change the bias voltages of the input terminals of the voltage followers 51, 52 from 0 V to −3 V and from −48 V to −45 V, respectively. As a result, the subscriber line interface circuit 21*a* is capable of transmitting and receiving an alternating current signal to and from the subscriber unit 11*a* even if there is no direct current loop. In this case, the power of the CODEC 42 is raised up to a working condition. This is because it is the general case that the power of the CODEC is lowered in an on-hook state so as to reduce the current consumed, so that A/D or D/A conversion is impossible.

The subscriber unit 11*a* which has transmitted the special service code, opens the switch 32*c* after a predetermined time so as to disconnect the direct current loop (step 303). The subscriber unit 11*a* has a structure which enables the transmission of an alternating current signal even after the direct current loop is disconnected.

Although the disconnection (SCN OFF) of the direct current loop is reported to the processor 25 via the centralized supervisory equipment 27, the processor 25 does not regard the SCN OFF signal as the end of communication but maintains the connection of the path between the calling subscriber unit and the called subscriber unit (step 406). In this manner the calling subscriber unit and the called subscriber unit assumes a communication state, and communication is made therebetween. In this period, no direct current loop is formed (step 407). In this case, since the OHT state is established so that an alternating current signal is passed into the subscriber unit 11*a* and the subscriber line interface circuit 21*a* without a direct current loop is established, the transmission and reception of data such as an electronic mail in an internet is possible.

In order to end the communication, the switch 32*c* of the subscriber unit 11*a* is closed so as to form a direct current loop temporarily (step 304), and disconnects the direct current loop after a predetermined time (step 305). The centralized supervisory equipment 27 detects the formation of a direct current loop (SCN ON) and the disconnection of the direct current loop (SCN OFF), and reports the result of detection to the processor 25 (steps 408, 409).

The processor 25 judges the disconnection of a direct current loop (SCN OFF) after it is formed (SCN ON) during communication to be the end of communication, executes an on-hook processing and disconnects the speech path between the subscriber units (step 410).

Figure 8:
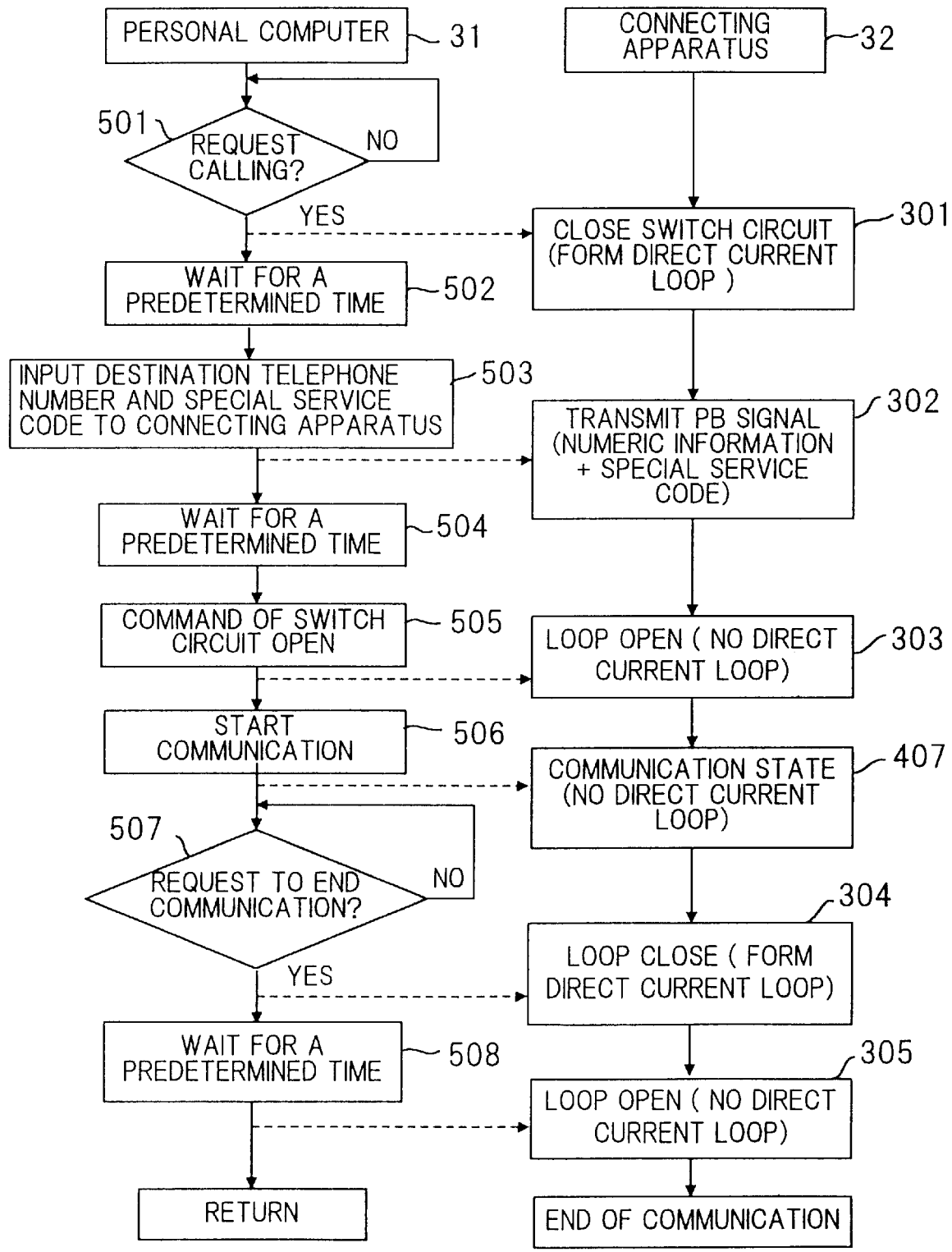
FIG. 8 is flow chart of processing by a personal computer.

FIG. 8 is a flow chart of an example of the communication processing by the personal computer 31. A flow chart (the same as the flow of the subscriber unit 11*a* shown in FIG. 6) of the processing by the connecting apparatus 32 is also shown.

When calling is necessary, the user requests calling by the operation of a key of the personal computer 31. When the key is operated, the personal computer 31 outputs a 'switch on' signal to the connecting apparatus 32 so as to turn on the switch circuit 32*c* and form a direct current loop (steps 501, 301). After waiting for a predetermined time (step 502), the personal computer 31 inputs the telephone number of the called subscriber and a special service code to the connecting apparatus 32 so as to make the PB oscillator 32*b* transmit the PB signal which corresponds to the telephone number and the special service code to the telephone cable (steps 503, 302).

The personal computer 31 waits for the end of the processing of the special service code by the exchange 10, in other words, the elapse of a predetermined time (step 504). The personal computer 31 then inputs a 'switch off' signal to the connecting apparatus 32 so as to turn off the switch circuit 32*c* and open the direct current loop (steps 505, 303).

Thereafter, the personal computer 31 starts the transmission and reception of data to and from the called terminal via the modulator-demodulator 32*a* (step 506). When the data communication is finished, the user executes an on-hook operation. By this operation, the personal computer 31 outputs a 'switch on' signal to the connecting apparatus 32 so as to turn on the switch circuit 32*c* and form a direct current loop (steps 507, 304). After the elapse of a predetermined time, the personal computer 31 inputs a 'switch off' signal to the connecting apparatus 32 so as to turn off the switch circuit 32*c* and open the direct current loop (steps 508, 305).

In this manner, when the calling subscriber unit instructs the disconnection of a direct current loop by a special service code, communication is possible in the state in which the direct current loop is disconnected, thereby reducing the power consumed by the exchange. In addition, the accurate on-hook processing is possible. When the calling subscriber unit does not instruct the disconnection of a direct current loop, communication is possible in a conventional protocol.

(C) First Modification

Although a push phone signal system for transmitting a destination telephone number and a special service code in the form of a PB signal is explained in the embodiment, it is also possible to transmit a destination telephone number and a special service code in a dial pulse system.

Figure 9:
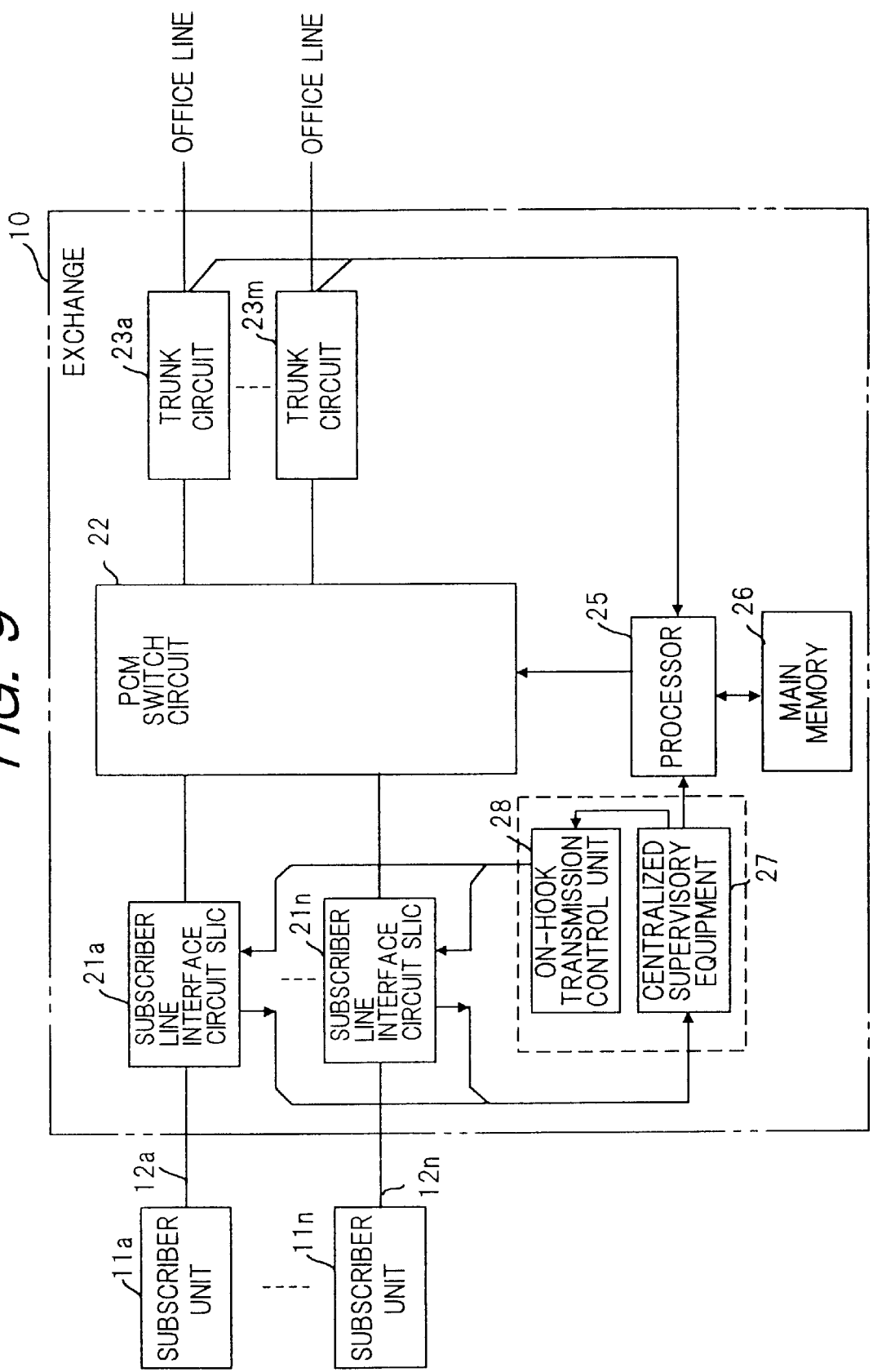
FIG. 9 shows the structure of an exchange (dial pulse system) according to the present invention.
Figure 10:
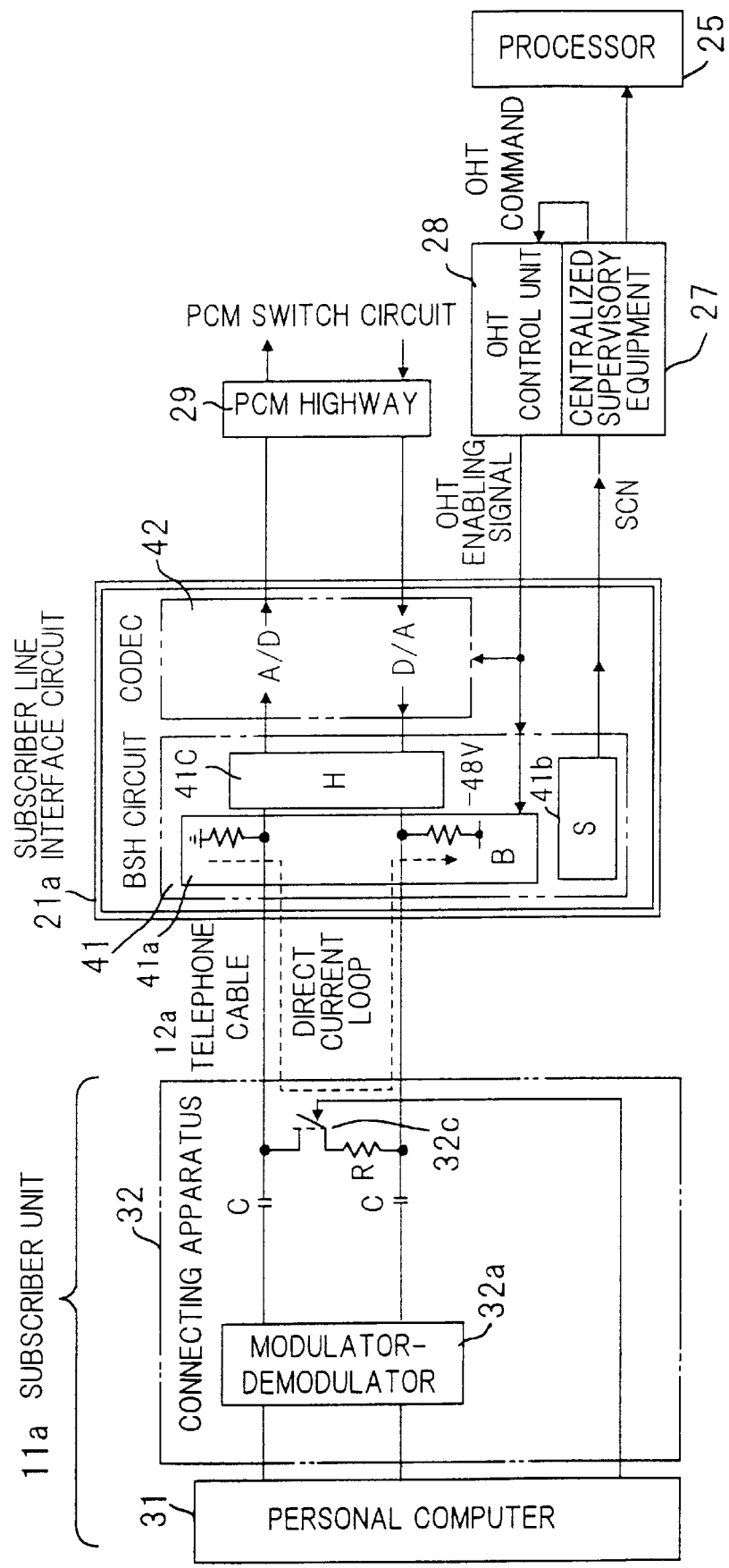
FIG. 10 shows the entire connection structure (dial-pulse system) including a subscriber unit and a subscriber line interface circuit.

FIG. 9 shows the structure of an exchange used in the case of transmitting a destination telephone number and a special service code in a dial pulse system, and FIG. 10 shows the entire connection structure including a subscriber unit and a subscriber line interface circuit in the case of transmitting a destination telephone number and a special service code in a dial pulse system. The same reference numerals are provided for the elements which are the same as those shown in FIGS. 1 and 3. The digital exchange 10 in FIG. 9 is different from that shown in FIG. 1 in that (1) the PB receiver 24 is eliminated, and (2) the centralized supervisory equipment 27 identifies the connection/disconnection of a direct current loop and the numeric information supplied in the form of a dial pulse, and controls the communication in accordance with a special service code in place of the processor 25, while the processor 25 executes the call processing in the same way as a conventional processor. In other words, the centralized supervisory equipment 27 reports the number of the subscriber line interface circuit in which a direct current loop is formed at the time of calling and the number of the identified called subscriber unit to the processor 25. The centralized supervisory equipment 27 also reports, to the processor 25, the number of the subscriber line interface circuit in which the direct current loop is disconnected at the end of communication. However, the centralized supervisory equipment 27 does not report the special service code to the processor 25 and executes the communication processing based on the special service code for itself.

The subscriber unit 11a in FIG. 10 is different from that shown in FIG. 3 in that (1) the PB oscillator 32b is eliminated and (2) the personal computer 31 turns on/off the switch 32c (connection/disconnection of a direct current loop), and generates a dial pulse DP which corresponds to a dial number and transmits the dial pulse.

At the time of calling, the personal computer 31 first closes the switch 32c and forms a direct current loop via the subscriber line interface circuit 21a. The personal computer 31 then turns on/off the switch 32c so as to transmit a destination telephone number (numeric information) and a special service code in the form of a dial pulse.

When the centralized supervisory equipment 27 in the exchange 10 detects the formation of the direct current loop in the subscriber line interface circuit 21a from the closed switch circuit 32c, the centralized supervisory equipment 27 reports the fact to the processor 25. In addition, when the centralized supervisory equipment 27 identifies the number of the called subscriber unit by the dial pulse signal, it reports the number to the processor 25. When the processor 25 receives the number of the called subscriber unit, it forms the speech path between the calling subscriber unit and the called subscriber unit.

When the centralized supervisory equipment 27 identifies a special service code in the dial pulse signal, it judges that the calling subscriber unit requests the disconnection of the direct current loop during communication, and establishes an on-hook transmission (OHT) state in the subscriber line interface circuit 21a. More specifically, when the centralized supervisory equipment 27 identifies the special service code, it inputs an OHT command to the OHT control unit 28. The OHT control unit 28 inputs an OHT enabling signal to the battery feed circuit 41a in accordance with the OHT command, thereby establishing an OHT state in the subscriber line interface circuit 21a. As a result, the subscriber line interface circuit 21a is capable of transmitting and receiving an alternating current signal to and from the subscriber unit 11a even if there is no direct current loop.

The subscriber unit 11a which has transmitted the special service code disconnects the direct current loop after a predetermined time. Although the disconnection (SCN OFF) of the direct current loop is detected by the centralized supervisory equipment 27, the centralized supervisory equipment 27 does not regard the SCN OFF signal as the end of communication nor reports it to the processor 25. As a result, the connection of the path between the calling subscriber unit and the called subscriber unit is maintained.

In this manner the calling subscriber unit and the called subscriber unit assume a communication state, and communication is made therebetween. In this period, no direct current loop is formed. In this case, since the OHT state is established so that an alternating current signal is passed into the subscriber unit 11a and the subscriber line interface circuit 21a without a direct current loop is established, the transmission and reception of data such as an electronic mail in an internet is possible.

In order to end the communication, the personal computer 31 turns on the switch 32c so as to form a direct current loop temporarily, and turns off the switch 32c after a predetermined time so as to disconnect the direct current loop. When the centralized supervisory equipment 27 detects the formation of a direct current loop (SCN ON) and then the disconnection of the direct current loop (SCN OFF) during communication, it regards the action as the end of communication and reports the end of communication to the processor 25. The processor 25 executes an off-hook processing and disconnects the speech path between the subscriber units.

This modification is advantageous in that it is possible to apply the present invention to the case of transmitting numeric information in the form of a dial pulse, and in that since the role of the processor 25 is completely the same as that of a conventional processor, it is not necessary to change the software of the processor 25.

Figure 11:
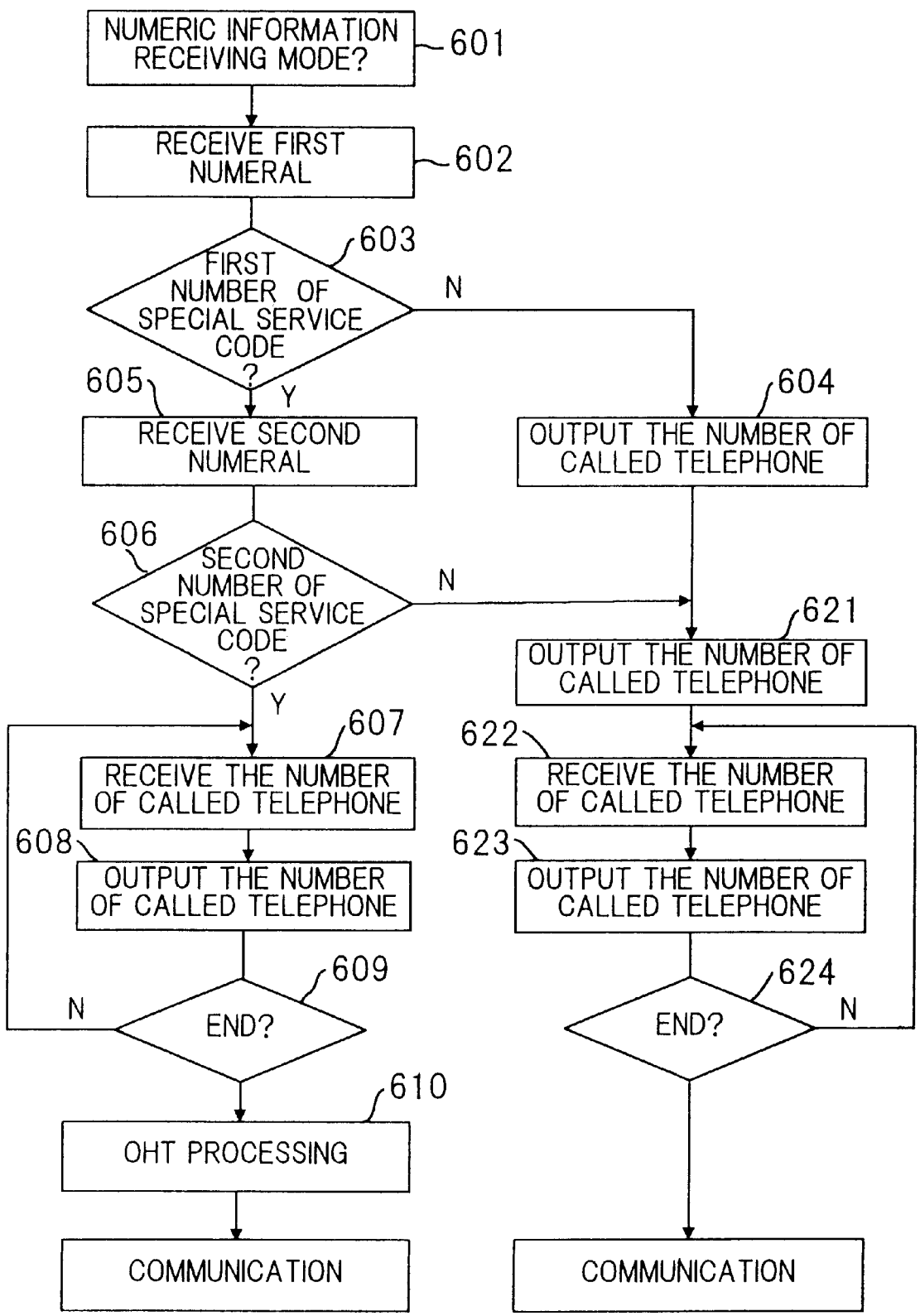
FIG. 11 is a flow chart of an example of a processing by a centralized supervisory equipment when it receives a numeral.

FIG. 11 is a flow chart of an example of a processing by the centralized supervisory equipment 27 when it receives a numeric information. It is assumed that a special service code is attached to the head of a destination telephone number, as shown in FIG. 7A, before transmission. The special service code has, for example, two numerals, and a numeral which is not used as the first digit in ordinary calling is selected for the first digit of the special service code.

When the centralized supervisory equipment 27 detects the formation of a direct current loop in the subscriber line interface circuit 21a, it assumes a numeric information receiving mode (step 601). In this numeric information receiving mode, if the centralized supervisory equipment 27 receives a first numeral, it judges whether or not the received numeral is the first number of the special service code (steps 602, 603). If the received numeral is not the first number of the special service code, it means the number of the called subscriber unit, so that the centralized supervisory equipment 27 transmits the received numeral to the a processor 25 as the first digit of the number of the called subscriber unit (step 604). On the other hand, if the received numeral is the first number of the special service code, the centralized supervisory equipment 27 waits for the reception of the next numeral. When the second numeral is received (step 605), judgement is made as to whether or not the received numeral is the second number of the special service code (step 606).

If the received numeral is the second number of the special service code, the numerals received thereafter are the number of the called subscriber unit. Consequently, every time the centralized supervisory equipment 27 receives a numeral, it transmits the numeral to the processor 25 as the number of the called subscriber unit, and when the reception of the number of the called subscriber unit is finished (steps 607 to 609), the centralized supervisory equipment 27 inputs an OHT command to the OHT control unit 28 (step 610). In this manner, the subscriber line interface circuit 21a is capable of transmitting and receiving an alternating current signal to and from the subscriber unit 11a even if there is no direct current loop, and communication is possible.

If the second numeral received at the step 605 is not judged to be the second number of the special service code at the step 606, the subsequent numerals including the numeral received at the step 605 (the numeral received for the first time at the step 602 is an error) are regarded as the number of the called subscriber unit. Therefore, the numeral received for the second time is transmitted to the processor 25 as the first digit of the number of the called subscriber unit (step 621). Thereafter, every time the numeral of the called subscriber unit is received, it is transmitted to the processor 25, and when the reception of the number of the called subscriber unit is finished, ordinary communication is enabled (steps 622 to 624).

If the numeral received for the first time at the step 602 is the first digit of the number of the called subscriber unit (steps 603, 604), every time the subsequent numerals of the called subscriber unit is received thereafter, it is transmitted to the processor 25 at the steps 621 to 624, and when the reception of the number of the called subscriber unit is finished, ordinary communication is enabled.

(D) Second Modification

Figure 12:
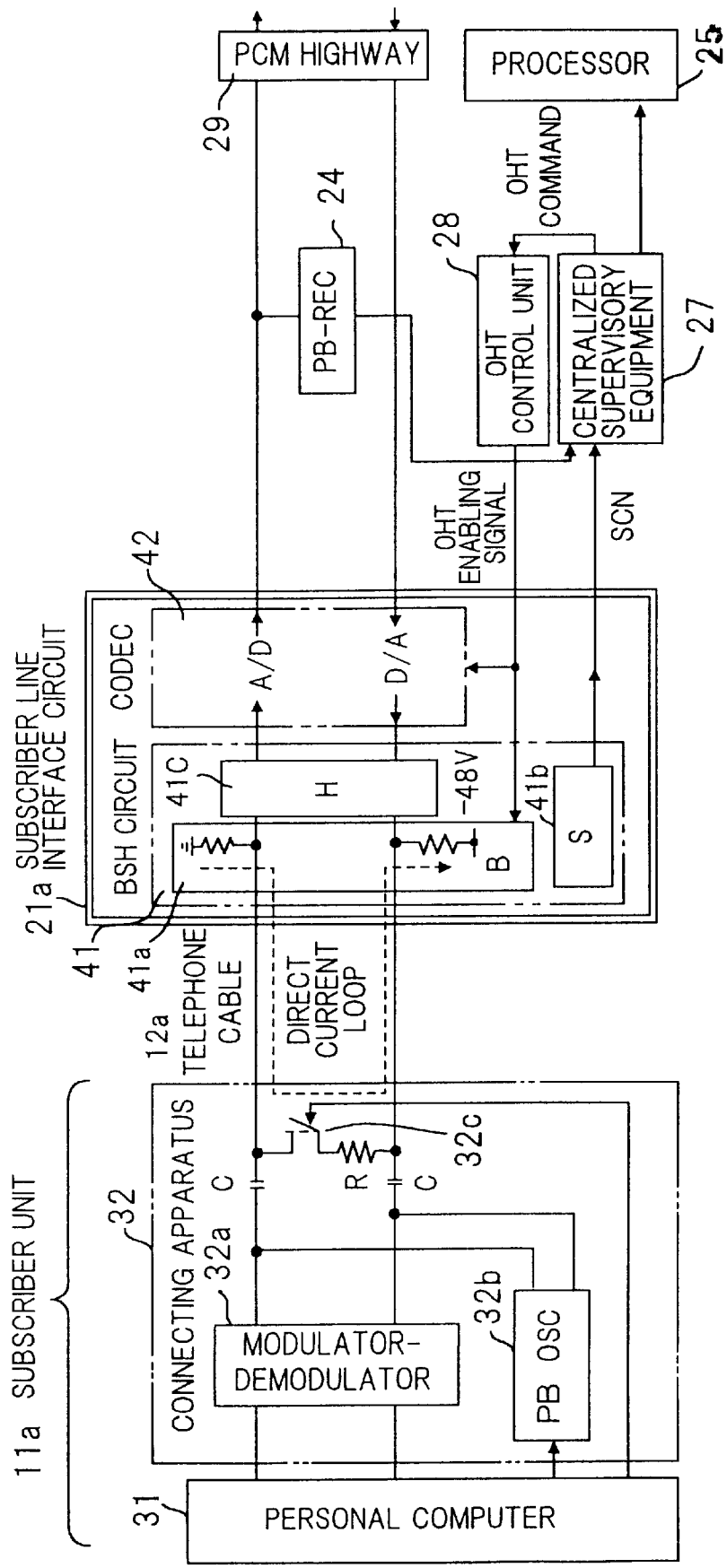
FIG. 12 shows an entire connection structure (push-phone system) including a subscriber unit and a subscriber line interface circuit.
Figure 13:
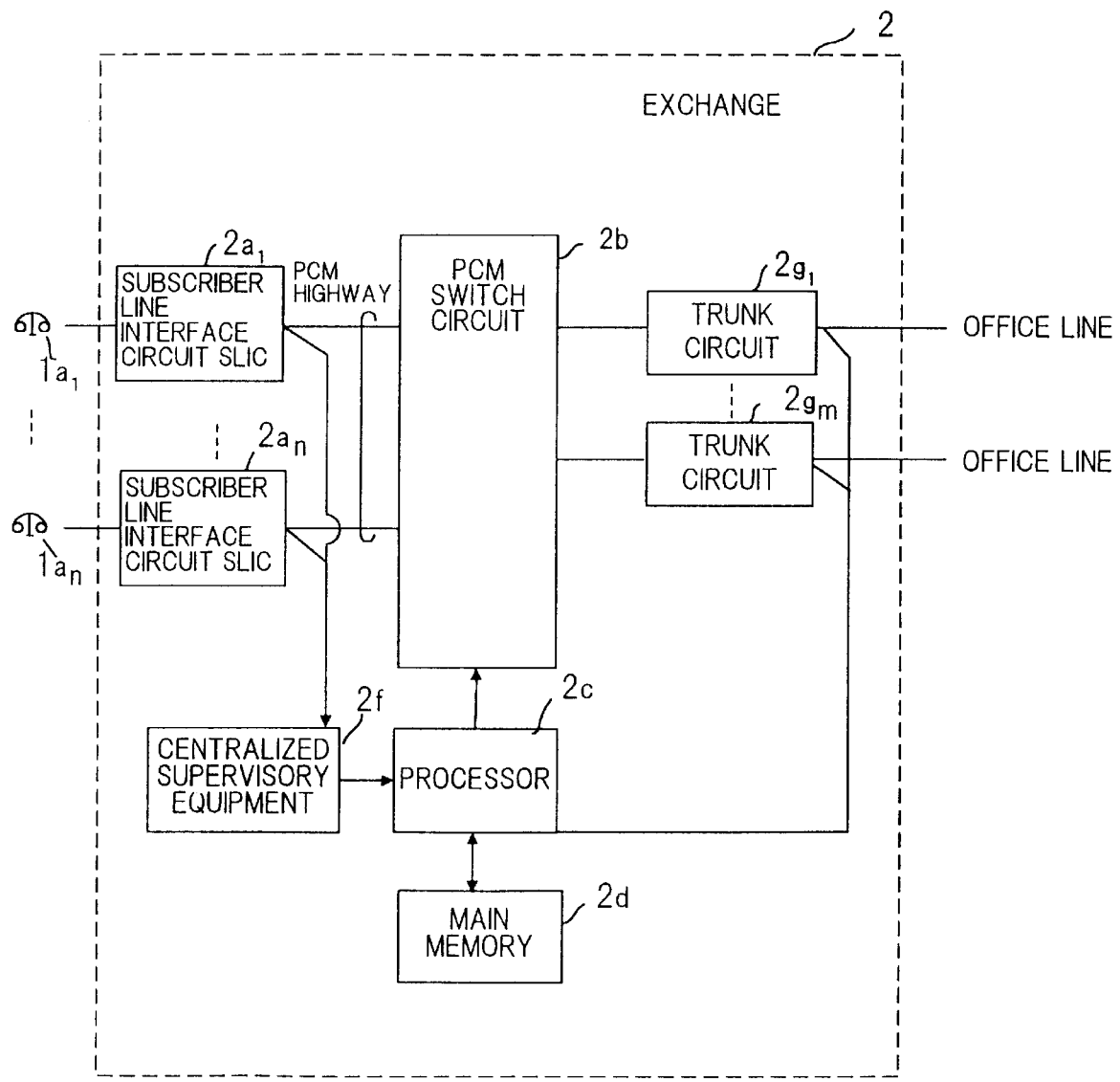
FIG. 13 shows the structure of a conventional exchange.
Figure 14:
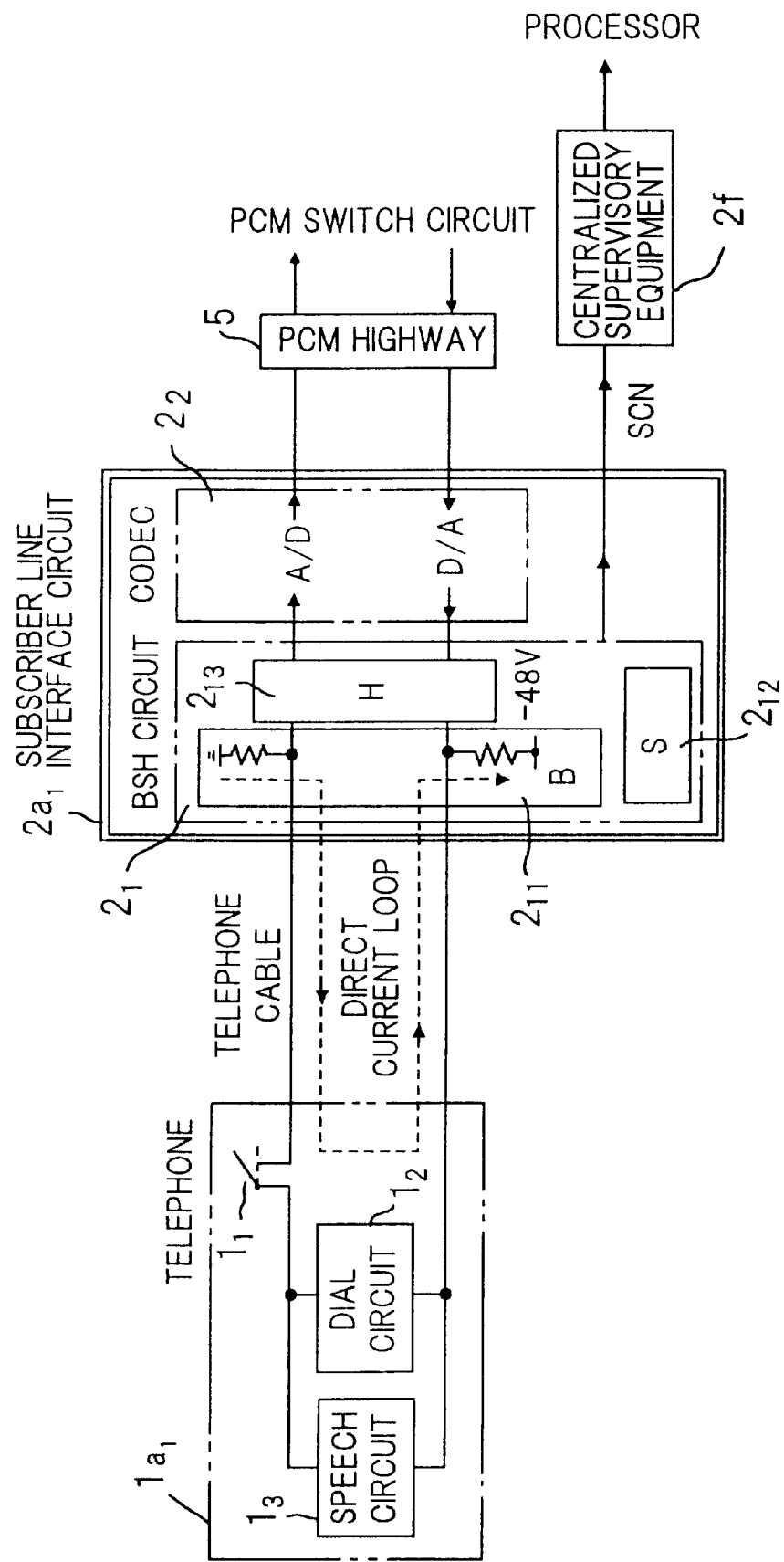
FIG. 14 shows the entire connection structure of a conventional exchange including a subscriber line interface circuit and telephones.
Figure 15:
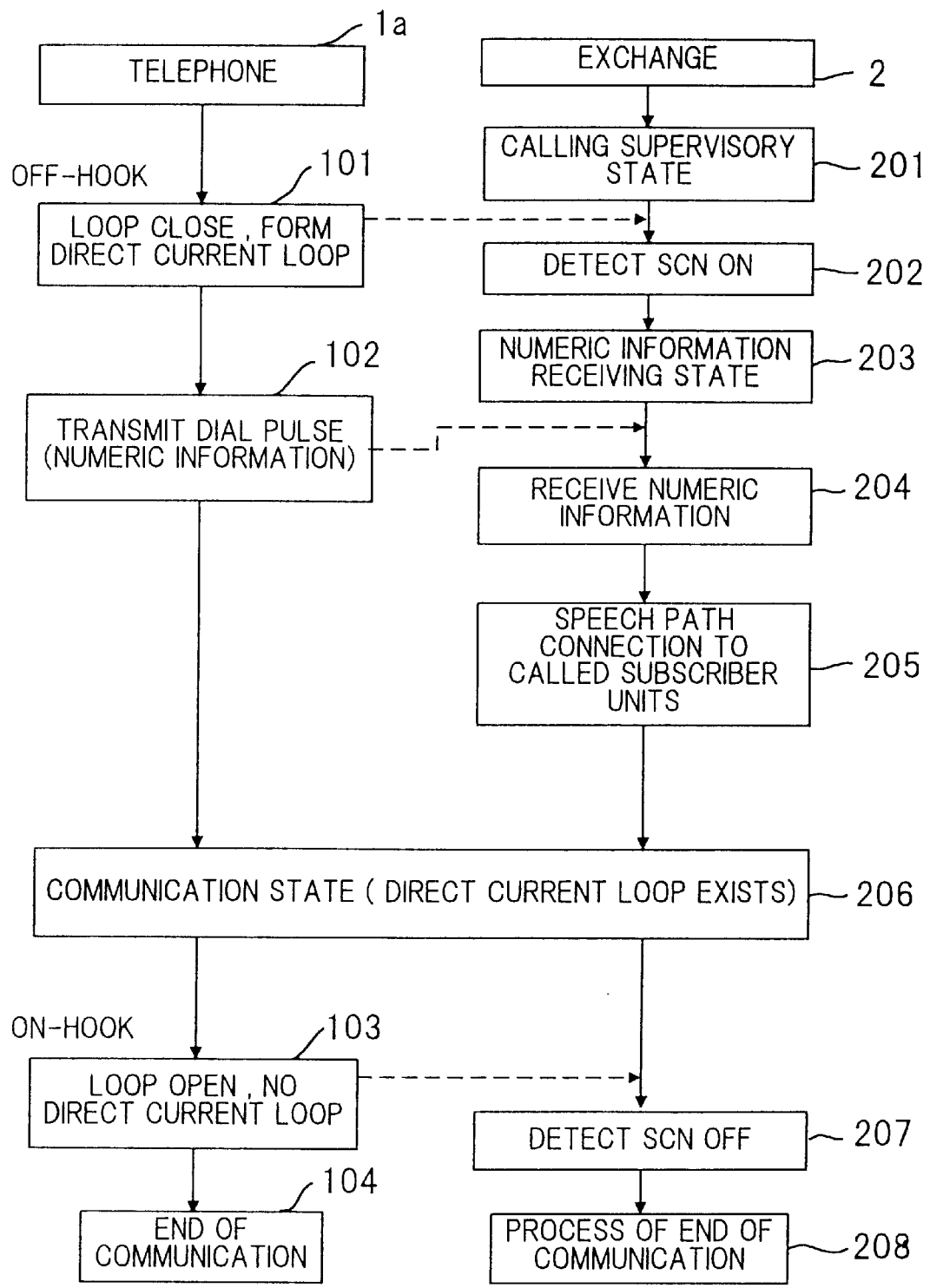
FIG. 15 is a flow chart of a conventional communication processing.
Figure 16:
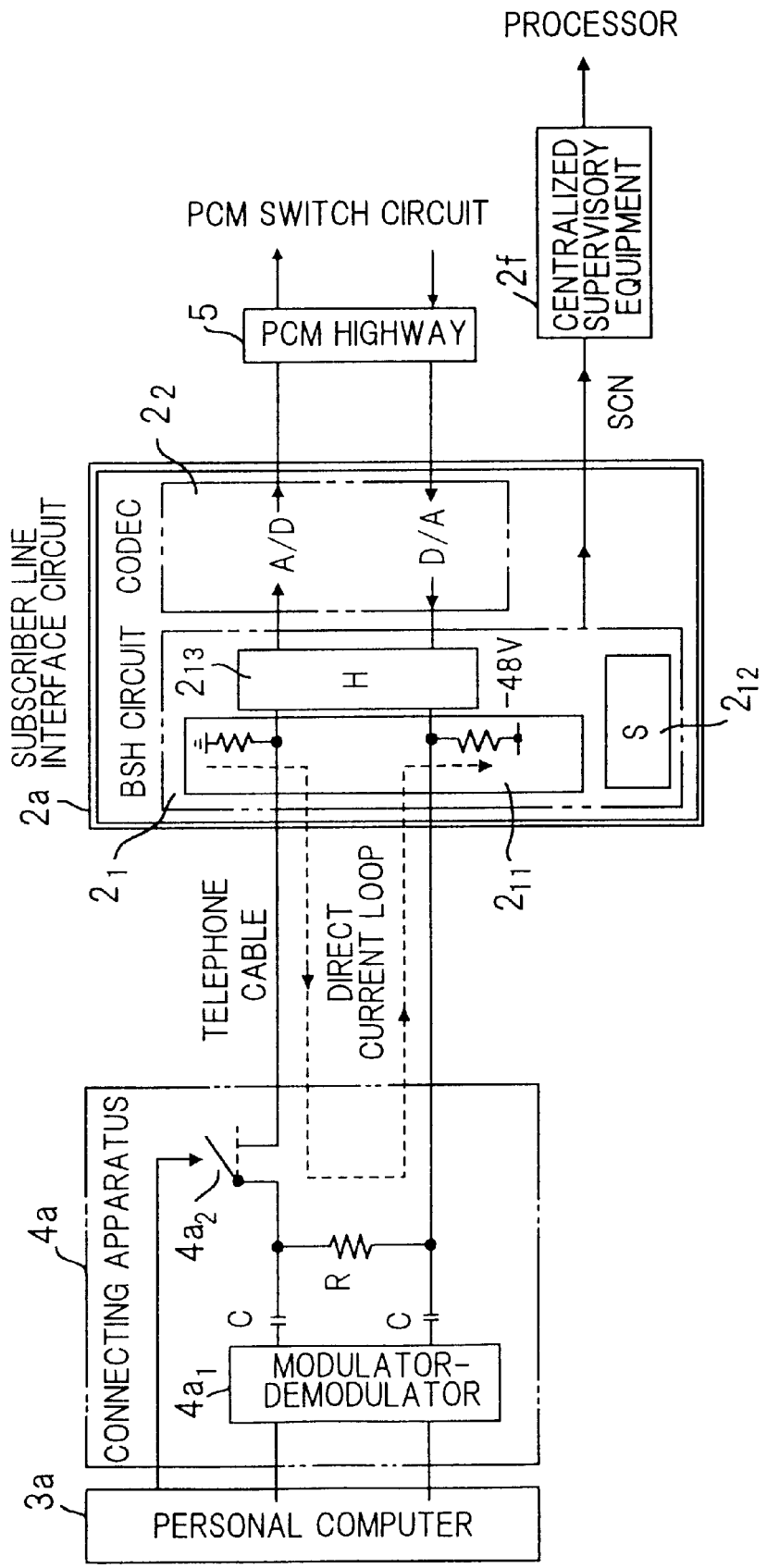
FIG. 16 shows the structure of the connection including a personal computer provided with a MODEM.

FIG. 12 shows the entire connection structure in a second modification. The same reference numerals are provided for the elements which are the same as those shown in FIG. 3. In the embodiment shown in FIGS. 1 and 3, the PB receiver 24 is connected to the PCM switch circuit 22, and the numeral information identified by the PB receiver 24 is input to the processor 25 so as to be processed on the basis of the special service code. In contrast, in the second modification, the PB receiver 24 is provided at the stage subsequent to the subscriber line interface circuit 21a, and the numeric information identified by the PB receiver 24 is input to the centralized supervisory equipment 27. The centralized supervisory equipment 27 executes a control on the basis of the special service code in the same way as in the first modification.

At the time of calling, the personal computer 31 first closes the switch 32c and forms a direct current loop via the subscriber line interface circuit 21a. The personal computer 31 controls the PB oscillator 32b so as to transmit a destination telephone number (numeric information) and a special service code in the form of a PB signal.

When the centralized supervisory equipment 27 in the exchange 10, which is in the calling supervising state, detects the formation of the direct current loop in the subscriber line interface circuit 21a from the closed switch circuit 32c, the centralized supervisory equipment 27 reports the fact to the processor 25. The PB receiver 24 identifies the numeric information supplied in the form of a PB signal, and inputs the numeric information to the centralized supervisory equipment 27. The centralized supervisory equipment 27 identifies the number of the called subscriber unit from the numeric information input from the PB receiver 24 and reports the number to the processor 25. When the processor 25 receives the number of the called subscriber unit, it forms a the speech path between the calling subscriber unit and the called subscriber unit.

If the centralized supervisory equipment 27 identifies the special service code from the numeric information supplied from the PB receiver 24, it establishes an on-hook transmission (OHT) state in the subscriber line interface circuit 21a. More specifically, when the centralized supervisory equipment 27 identifies the special service code, it inputs an OHT command to the OHT control unit 28. The OHT control unit 28 inputs an OHT enabling signal to the battery feed circuit 41a in accordance with the OHT command, thereby establishing an OHT state in the subscriber line interface circuit 21a. As a result, the subscriber line interface circuit 21a is capable of transmitting and receiving an alternating current signal to and from the subscriber unit 11a even if there is no direct current loop.

The personal computer 31 in the subscriber unit 11a which has transmitted the special service code disconnects the direct current loop after a predetermined time. Although the disconnection (SCN OFF) of the direct current loop is detected by the centralized supervisory equipment 27, the centralized supervisory equipment 27 does not regard the SCN OFF signal as the end of communication nor reports it to the processor 25. As a result, the processor 25 maintains the connection of the path between the calling subscriber unit and the called subscriber unit.

In this manner the calling subscriber unit and the called subscriber unit assume a communication state, and communication is made therebetween. In this period, no direct current loop is formed. In this case, since the OHT state is established so that an alternating current signal is passed into the subscriber unit 11a and the subscriber line interface circuit 21a without a direct current loop is established, the transmission and reception of data such as an electronic mail in an internet is possible.

In order to end the communication, the personal computer 31 turns on the switch 32c so as to form a direct current loop temporarily, and turns off the switch 32c after a predetermined time so as to disconnect the direct current loop. When the centralized supervisory equipment 27 detects the formation of a direct current loop (SCN ON) and then the disconnection of the direct current loop (SCN OFF) during communication, it regards the action as the end of communication and reports the end of communication to the processor 25. The processor 25 executes an on-hook processing and disconnects the speech path between the subscriber units.

The second modification is advantageous in that it is possible to apply the present invention to the case of transmitting numeric information in the form of a PB signal, and in that since the role of the processor 25 is the completely same as that of a conventional processor, it is not necessary to change the software of the processor 25.

As explained above, according to the present invention, it is possible to disconnect a direct current loop during communication, so that it is possible to reduce the power consumed by the exchange even if the line is continuously used for many hours, thereby solving the problem of the capacity of the power source and the generation of heat of an exchange.

In addition, since communication with no power feed is enabled under a simple control by transmitting a special service code which instructs the disconnection of a direct current loop in the line together with a destination telephone number from the subscriber unit in the form of a PB signal or DP signal, it is possible to reduce the power of an exchange as a whole.

According to the present invention, since a communication protocol is changed so as to enable communication with no power feed based on a special service code while maintaining the original call/on-hook protocol based on the connection/disconnection of a direct current loop, a subscriber unit can select conventional communication with power feed by not instructing the disconnection of a direct current loop, while another subscriber unit can select communication with no power feed by instructing the disconnection of a direct current loop.

The present invention is usefully applicable to the communication of data in an internet by a personal computer provided with a MODEM.

According to the present invention, communication without power feed is enabled without the need for changing the software of the processor of an exchange by controlling the communication with no power feed by a centralized supervisory equipment.

Furthermore, according to the present invention, it is possible to provide an exchange which is capable of reducing the power consumed thereby and which does not bring about a problem of the capacity of the power source or the generation of heat even if a circuit is continuously used for many hours.

As many apparently widely different embodiments of the present invention can be made without departing from the spirit and scope thereof, it is to be understood that the invention is not limited to the specific embodiments thereof except as defined in the appended claims.

What is claimed is:

1. A method for communication in an exchange including a step for forming a direct current loop through a subscriber line interface circuit of an exchange and a calling subscriber unit which is connected to the subscriber line interface circuit by closing a switch circuit in the calling subscriber unit, a step for designating number of a called subscriber unit from the calling subscriber unit and a step for forming a speech path between the called subscriber unit and the calling subscriber unit while the formation of said direct current loop is detected in said subscriber line interface circuit, comprising the steps of:

closing a switch circuit of a calling subscriber unit which is connected to a subscriber line interface circuit of an exchange so as to form a direct current loop through said subscriber line interface circuit and said calling subscriber unit;

transmitting a special service code for instructing the disuse of said direct current loop together with the number of a called subscriber unit from said calling subscriber unit to the exchange;

forming a speech path by said exchange between said calling subscriber unit and said called subscriber unit;

establishing an on-hook transmission state in said subscriber line interface circuit to which said calling subscriber unit which has transmitted said special service code is connected, by said exchange, in which transmission and reception of an alternating current signal is possible between said subscriber line interface circuit and said calling subscriber unit even if no direct current loop is formed;

opening said switch circuit of said calling subscriber unit so as to disconnect said direct current loop;

maintaining said speech path between said calling subscriber unit and said called subscriber unit by said exchange even after said direct current loop is disconnected; and transmitting and receiving an alternating current signal between said subscriber line interface circuit and said calling subscriber unit in said on-hook transmission state.

2. A method for communication with no power feed according to claim 1, wherein said calling subscriber unit transmits said special service code together with said number of said called subscriber unit in the form of a push-phone signal (PB signal) produced by synthesizing a high-frequency signal and a low-frequency signal which correspond to a numeral and/or a symbol; and said exchange establishes said on-hook transmission state in said subscriber line interface circuit to which said calling subscriber unit which has transmitted said special service code is connected, when a PB receiver provided in said exchange detects said special service code from said PB signal.

3. A method for communication with no power feed according to claim 1, wherein said calling subscriber unit transmits said special service code together with said number of said called subscriber unit in the form of a dial pulse signal (DP signal) which corresponds to a numeral; and said exchange establishes said on-hook transmission state in said subscriber line interface circuit to which said calling subscriber unit which has transmitted said special service code is connected, when a dial pulse supervisor provided in said exchange detects said special service code from DP signal.

4. A method for communication with no power feed according to claim 1, further comprising the steps of:

closing said switch circuit in said calling subscriber unit so as to form a direct current loop while said speech path is maintained, and thereafter opening said switch circuit so as to disconnect said direct current loop; and executing an on-hook processing in said exchange when the exchange detects the disconnection of said direct current loop after said direct current loop is formed while said speech path is maintained.

5. An exchange including means for forming a direct current loop through a subscriber line interface circuit of an exchange and a calling subscriber unit which is connected to the subscriber line interface circuit by closing a switch circuit in the calling subscriber unit and means for forming a speech path between the calling subscriber unit and a called subscriber unit designated by the numbers supplied from the calling subscriber unit while the formation of said direct current loop is detected in said subscriber line interface circuit, comprising:

a subscriber line interface circuit connected to a calling subscriber unit which forms a direct current loop therebetween by closing a switch circuit wherein the subscriber line interface circuit is able to assume an on-hook transmission state in which transmission and reception of an alternating current signal is possible between said subscriber line interface circuit and said calling subscriber unit even if no direct current loop is formed;

a means for receiving numerals transmitted from said calling subscriber unit via said subscriber line interface circuit after the formation of the direct current loop and detecting a special service code which designates the disuse of said direct current loop from said numerals received;

a means for forming a speech path between said calling subscriber unit and a called subscriber unit the number of which is designated by said calling subscriber unit and detected from said numerals received;

a means for establishing an on-hook transmission state in said subscriber line interface circuit to which said calling subscriber unit which has transmitted said special service code is connected, when said special service code is detected; and a means for maintaining said speech path between said calling subscriber unit which has transmitted said special service code and said called subscriber unit even if said direct current loop is disconnected, when said special service code is received, wherein an alternating current signal is transmitted and received between said subscriber line interface circuit and said calling subscriber unit in said on-hook transmission state.

6. An exchange according to claim 5, wherein said means for maintaining said speech path executes an on-hook processing when the disconnection of said direct current loop is detected after said direct current loop is formed while said speech path is maintained.

7. An exchange according to claim 6, wherein said calling subscriber unit includes a personal computer and a connecting apparatus; and said connecting apparatus has a means for modulating an alternating current signal with a digital signal from said personal computer, transmitting the modulated signal to said subscriber line interface circuit, demodulating an alternating current signal from said subscriber line interface circuit into a digital signal and inputting the demodulated signal into said personal computer; a means for transmitting said number of said called subscriber unit and said special service code to said subscriber line interface circuit under the control of said personal computer, and said switch circuit for forming and disconnecting said direct current loop.

* * * * *